Dec. 8, 1964

C. A. CARLSON 3,159,927

ROCK PULLER WITH MEANS TO ROTATE THE
DIGGING TEETH UNDER THE FRAME

Filed Aug. 3, 1962

INVENTOR.
CLIFTON A. CARLSON
BY
Meyers & Peterson
ATTORNEYS

INVENTOR.
CLIFTON A. CARLSON
BY
Meyers & Peterson
ATTORNEYS

United States Patent Office 3,159,927
Patented Dec. 8, 1964

3,159,927
ROCK PULLER WITH MEANS TO ROTATE THE
DIGGING TEETH UNDER THE FRAME
Clifton A. Carlson, Gilby, N. Dak.
Filed Aug. 3, 1962, Ser. No. 214,647
1 Claim. (Cl. 37—2)

This invention relates generally to earthworking apparatus, and pertains more particularly to versatile apparatus of this character possessing especial utility in removing rocks and the like from the ground, although the invention will also find usefulness as a subsoiler or for laying underground telephone lines, pipes and the like.

One object of the invention is to provide earthworking apparatus that utilizes its own weight in first sinking the plurality of teeth or single tooth (as the case may be) into the ground, and in which apparatus a choice then exists as to whether the entire apparatus is to be pulled forwardly by the tractor hitched thereto or whether only the teeth (or tooth) are to be swung about a fixed horizontal pivotal axis.

Another object of the invention is to provide rock pulling apparatus having teeth for penetration into the soil which teeth can be adjusted into any preferred angular relationship with respect to the general orientation of the apparatus.

A further object of the invention is to provide apparatus in which the teeth can be readily replaced with assemblies having different tooth configurations. In this way, the versatility of the apparatus is enhanced, because various tasks can be easily performed.

Yet another object of the invention is to provide for facile elevation of the teeth to allow the apparatus to be pulled past rocks, stumps and the like that have been removed from the ground.

Still another object of the invention is to provide earthworking apparatus that is exceedingly rugged and that is not apt to get out of order readily.

These and other objects and advantages of my invention will more fully appear from the following description, made in connection with the accompanying drawings, wherein like reference characters refer to the same or similar parts throughout the several views and in which.

Figure 1:
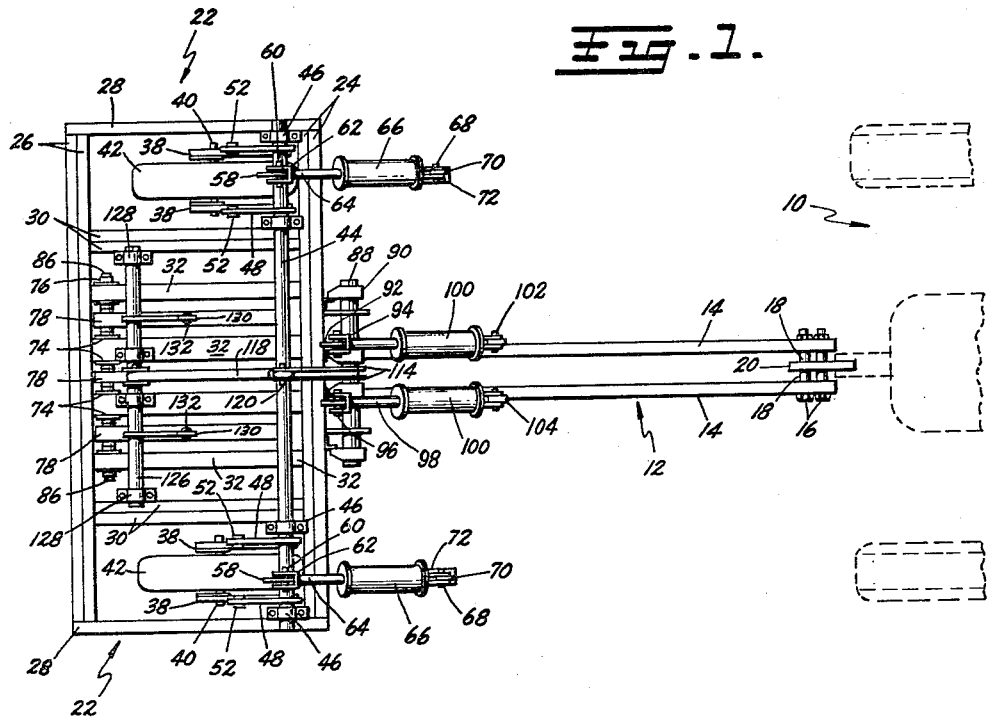
FIGURE 1 is a plan view of my earthworking apparatus in the form of a rock digger or puller hitched to the rear end of a tractor pictured in phantom outline.

Referring now in detail to the drawings, it will be observed that the rear end of a tractor 10 has been depicted in phantom outline in FIGURE 1. This tractor is the towing vehicle for the earthworking apparatus now to be described.

The earthworking apparatus exemplifying the teachings of the invention comprises a basic frame 12 that is connected at its forward end to the rear of the tractor 10. The frame 12 includes parallel longitudinal beams 14 in the form of channels. At the forward end, these channels are secured together via bolts 16 with spacers 18 so as to centrally position a hitch plate 20.

The rear end of the frame 12 includes laterally extending wing portions 22 comprised of forward transverse beams or channels 24 arranged with the edges of the horizontal flanges thereof in abutting relationship with each other. Similarly, rear transverse channels 26 are provided. A rectangular configuration is formed by side members 28 that are secured at their ends to the ends of the channels 24, 26. Within the rectangular structure that is formed are first auxiliary channels 30 that extend parallel to the side channels 28 with their flange edges together and have their ends welded to the underside of the channels 24, 26. Four additional members 32 underlie the channels 24, 26 and have their upper flange surfaces also welded to the underside of these channels 24, 26.

The laterally extending wing portions 22 are each provided with two pairs of downwardly depending shaft supports or brackets 34. In the illustrative situation, the supports 34 are welded to the underside of the forward transverse channels 24. As their name implies, the shaft supports 34 carry respective shafts 36, these shafts 36 being suitably journaled at the lower ends of said supports 34. Fixedly attached to the shafts 36 are parallel spaced fork members 38 that project downwardly and have at their lower ends in each instance an axle 40 on which is rotatably disposed a wheel 42.

At this time, attention is directed to a cross shaft 44 journaled for rotation in suitable pillow block bearings 46 that can be appropriately attached or mounted to spaced portions of the laterally extending wing portions 22. Because there are two fork members for each wheel, it follows that under these particular circumstances there is a need for two pairs of spaced rocker arms 48 on the shaft 44. These arms 48 are fixedly supported on the shaft and are moved in unison therewith. The arms have a pin 50 in each instance that articulatively connects its respective arm to a link 52 provided with a clevis at each end, the link 52 in turn having a pin 54 at its lower end that articulatively connects the link to an ear 56 on the previously-mentioned fork member associated therewith. Hence, there are four links 52 in the exemplary situation, each serving to connect a particular arm 48 to a particular fork member 38.

Describing now the actuating mechanism that is intended to shift the wheels relative to the baisc frame 12 for the purpose of raising and lowering the frame, it is to be observed that the shaft 44 is equipped with a pair of actuating arms 58 that are, of course, fixedly secured to this shaft. A clevis 62 is used in connection with each arm 58 so that a pin 60 passing through each clevis will connect the clevis and hence its particular arm 58 to the projecting end of a piston rod 64. The piston rod is slidably received within a hydraulic cylinder 66 having its closed end connected via a pin 68 to an upstanding ear 70 disposed at the free end of a bracket 72 that is secured to the foremost channel 24. Thus, there are two hydraulic cylinders 66 for the purpose of actuating the arms 58 through a preferred angle in order to raise and lower the basic frame 12.

A plurality of downwardly projecting support plates or straps 74, more specifically eight in number, have their upper ends welded to the various additional pairs of channels 38 forming integral parts of the previously referred to wing portions 22. The lower ends of these plates 74 are apertured and a sleeve 76 is fixedly secured therein.

Playing an important role in the practicing of the instant invention are several teeth 78 which can be of composite construction, but in the illustrative situation, they are to be construed as being substantially unitary in order to simplify the drawings as much as possible. However, each tooth 78 is provided with a hardened wear plate 80 that is detachably secured to its particular tooth 78 through the agency of a pair of bolts 82. A rod 84 (or other reinforcing means) passes through the various sleeves 70 carried by the support plates 74, thereby mounting the various teeth for swinging movement through an arc about the shaft 86. While usually several teeth 78 will be used, it is within the contemplation of the invention to use any preferred number of teeth, even using just one large tooth where a trenching operation is to be undertaken. It will be recalled that it was hereinbefore stated that the invention would find utility in various situations, these being embracive of laying underground telephone lines, piping and the like.

The actuating mechanism for the teeth 78 includes a cross shaft 88 rotatably carried in bearings on brackets 90. Fixedly attached to the shaft 88 are two actuating arms 92 that connect with a clevis 94 in each instance through the instrumentality of a pin 96. The two clevises 94 are mounted on the projecting ends of piston rods 98 associated with hydraulic cylinders 100. The closed ends of the hydraulic cylinders 100 are connected via pins 102 to brackets 104 that are secured to the beams 14. Thus, there is one hydraulic cylinder 100 for each of the two actuating arms 92. The shaft 88 also has fixedly attached thereto downwardly projecting arms 106 that have attached to their lower ends chains 108. The other ends of these chains 108 carry clevises 110 that are used for attaching the chains directly to the outer teeth 78. Owing to the manner in which the teeth 78 are held in a fixed relationship with each other, the chains 108 are instrumental in pulling all three teeth forwardly. However, the desirability of doing this will become clear from the operational description hereinafter presented.

A central take-up arm 114 is also fixedly disposed on the shaft 88. More precisely, the take-up arm 114 is composed of two parallel strips as can readily be seen from an inspection of FIGURE 1. A pair of telescoping tubes 116 and 118 are employed, the latter of these tubes or members being pivotally connected by a pin 120 to the take-up arm 114, more specifically between the parallel strips constituting same. A pin 122 similarly connects the tube 118 to an arm 124 fixedly carried on a shaft 126. The shaft 126 is journalled for rotation in a pair of pillow block bearings 128 disposed on the channels 30 that have previously been referred to. The shaft 126 has mounted thereon arms 130, there being two in this instance inasmuch as there is to be one for each of the outer two of the three teeth 78. Each of the arms 130 has the upper end of a coil spring 132 attached thereto and the lower end of each coil spring 132 is fastened to the upper end of a flexible chain 134 having a clevis 136 (labeled only in FIGURES 3 and 4) to permit the connection of the lower end of the chain to its corresponding or associated outer tooth 78 through the medium of a pin 138.

Figure 4:
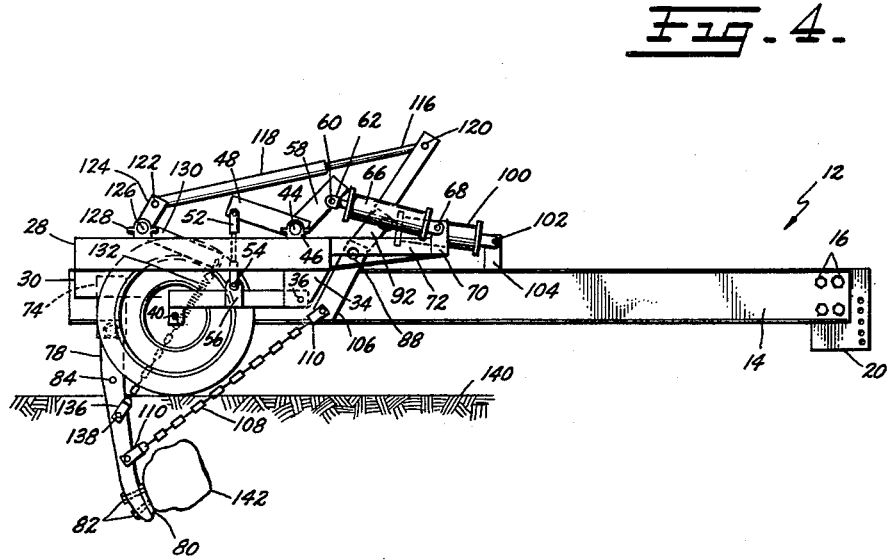
FIGURE 4 is still another side elevational view, the teeth in this instance being in a proximal relationship with a rock that is to be pulled out of the ground.

Having presented the foregoing information, the manner in which my apparatus operates should be readily understandable from the description now to be given. First, it is to be noted that the ground line has been indicated by the reference numeral 140 and it may be assumed that the apparatus is to be employed in removing an embedded rock 142 (FIGURE 4).

Figure 2:
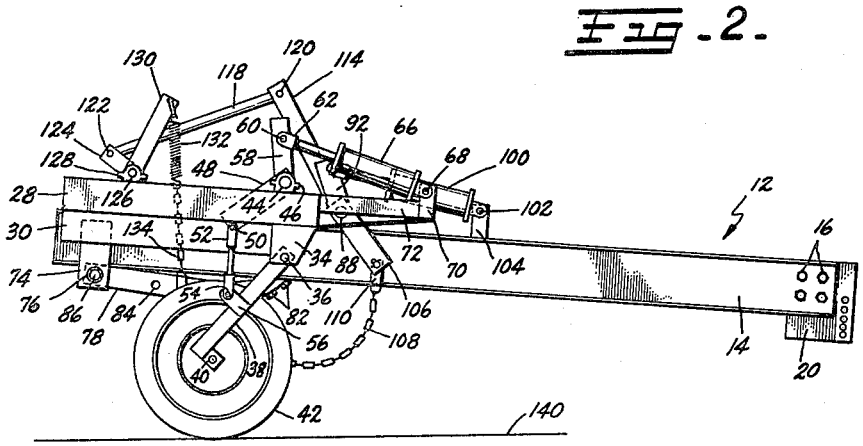
FIGURE 2 is a side elevational view corresponding to FIGURE 1 showing to better advantage the relative positions of the various parts prior to initiating a rock digging operation.

Accordingly, attention is first called to the position of the apparatus in FIGURE 2. Such a condition of the parts shows all of the hydraulic cylinders 66 and 100 with their piston rods 64 and 98, respectively, fully extended. This has the result of causing the actuating arms 58 on the shaft 44 to be urged in a counterclockwise direction as viewed in FIGURE 2. This causes the various arms 48 to react against the fork members 38 via the links 52 to raise the frame 12 into the position in which it appears in FIGURE 2.

Due to the fact that the piston rods 98 are fully extended, the actuating arms 92 are rotated in a counterclockwise direction to bring the arms 106 into the position in which they are presented in this particular figure. Concomitantly, the take-up arm 114 is moved so as to telescope the tubes or members 116, 118 together. The constricted relationship of the members 116, 118 causes the arms 124 to rotate shaft 126 with the consequence that the arms 130 on this shaft are raised into the relationship pictured in the figure now being discussed. This has the effect of lifting or swinging upwardly the several teeth 78 so that they are completely out of the way.

In preparation for a rock removing procedure, though, the teeth 78 must be oriented in a substantially vertical position so as to penetrate downwardly into the ground 140. To do this, the hydraulic cylinders 100 are operated so as to retract their piston rods 98 farther within the cylinder, this action causing the shaft 88 to be rotated in a clockwise direction. Rotation of the shaft 88 in such a direction causes the arms 106 to move in a clockwise direction until they strike the lower edge of the foremost channel 24 (or other fixed stop) to establish a substantially vertical relationship of the teeth 78.

Figure 3:
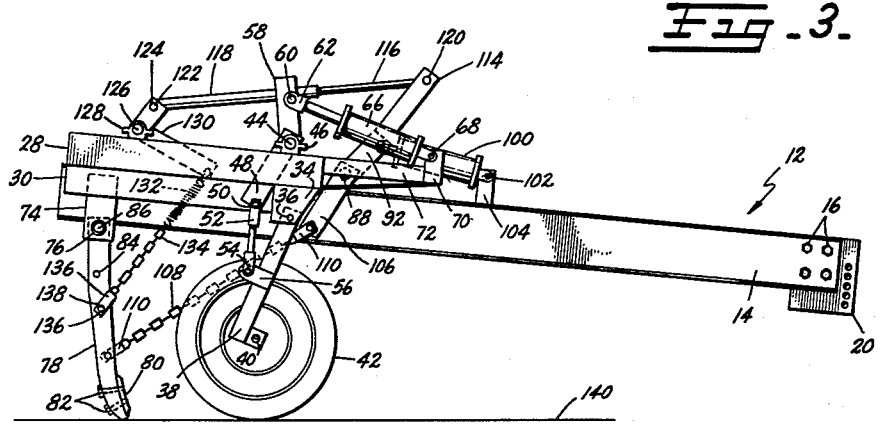
FIGURE 3 is another side elevational view, this view showing the earth-engaging teeth ready to be forced into the ground.

At the same time, the take-up arm 114 is moved into the position in which it appears in FIGURE 3, causing the arm 124, the shaft 126 and the arms 130 thereon to rotate in a clockwise direction also. As can be seen from FIGURE 3, this permits the teeth 78 to be lowered, the springs 132 and the chains 134 connected thereto permitting this to occur.

The apparatus is then in readiness for lowering the basic frame 12. It will be appreciated that the basic frame 12 and all of the parts carried thereby contribute appreciably to its weight. Use of this weight is made for forcing the teeth 78 downwardly into the ground 140.

The actual lowering of the frame 12 is accomplished by retracting the piston rods 64 into the hydraulic cylinders 66. Such a retractive action causes the actuating arms 58 to assume the position in which they appear in FIGURE 4. Inasmuch as the two pairs of spaced arms 48 are fixedly mounted on the shaft 44, these arms also move in a clockwise direction. Owing to the fact that the shaft 44 is carried on the frame 12, the end result is that the frame is lowered. In this regard, it will be recalled that the links 52 are connected between the arms 48 and the fork members 38 to which the wheels 42 are attached.

What has transpired is pictorially presented in FIGURE 4, and it is to be noted that the teeth are shown in a proximal relationship with the embedded rock 142. After reaching this stage of events, the operator has two courses of action open to him. He can move the tractor 10 forwardly under its own power, thereby pulling the frame 12 and, of course, the parts associated therewith including the teeth 78. This would have the effect of dislodging the rock 142, for the arms 106 are under these circumstances against the foremost channel 24 (or other stop). On the other hand, the operator has the choice of extending the piston rods 98 from their hydraulic cylinders 100 which rotate the actuating arms 92 in a counterclockwise direction. Since the arms 106 are also fixedly mounted on the shaft 88, they also move in a counterclockwise direction to pull the chains 108 in a direction to cause the pivotal or swinging movement of the teeth 78 upwardly. Sufficient pivotal movement will bring the rock 142 to the surface of the ground 140. During this stage of events, the take-up arm 114 will also be moved in a counterclockwise direction to telescope the tubes 116, 118 together which action causes the arms 124 to be rotated counterclockwise. The rotation of the arms 124 in a counterclockwise direction also causes the shaft 126 to so move, and the arms 130 are responsible for elongating or stretching the coil springs 132. It will be appreciated that the springs 132 yield sufficiently to do this, but when the rock has been brought to the surface, then the springs function to return the teeth 78 to their raised position, this raised position being pictured in FIGURE 2. Hence, the apparatus can be pulled forwardly by the tractor 10 without interference, the apparatus merely passing over the now raised rock 142.

To demonstrate the versatility of the invention, it can be pointed out that the teeth 78 need not penetrate as far downwardly as they have been illustrated in FIGURE 4.

Hence, if the penetration is part way, then the apparatus can be employed for subsoiling purposes. Still further, if an intermediate angular position of the teeth 78 is desired, the hydraulic cylinders 100 can be operated so as to bring the piston rods 98 into an intermediate position, thereby imparting the desired or preferred angle to the teeth 78. Still further, the teeth that have been shown can be completely replaced with teeth of other configurations, the shaft 86 being removed so that a different tooth assembly can be substituted for that that has been shown.

It will, of course, be understood that various changes may be made in the form, details, arrangements and proportions of the parts without departing from the scope of my invention as set forth in the appended claim.

What is claimed:

A rock puller comprising:

(a) frame means;
(b) downwardly extending arm means;
(c) means pivotally connecting the upper end of said arm means to said frame means;
(d) a pair of wheels rotatably attached to the lower end of said arm means;
(e) a first transverse shaft mounted for rotation on said frame means;
(f) first arm means affixed to said first shaft for rotation therewith;
(g) link means pivotally connected between said first arm means and said downwardly extending arm means;
(h) second arm means affixed to said first shaft;
(i) hydraulic operating means carried by said frame means for actuating said second arm means through various angles to in turn actuate said downwardly extending arm means through various angles to raise and lower said frame means;
(j) a plurality of earth-engaging teeth;
(k) means pivotally mounting the upper ends of said teeth to said frame means;
(l) a second transverse shaft mounted for rotation on said frame means;
(m) first arm means affixed to said second shaft for rotation therewith;
(n) means connected between said first arm means of said second shaft and said teeth for positioning said teeth in different angular positions relative said frame means;
(o) second arm means affixed to said second shaft;
(p) second hydraulic operating means carried by said frame means for actuating the second arm means of said second shaft through various angles to effect the positioning of said teeth in different angular positions;
(q) third arm means affixed to said second shaft;
(r) a third transverse shaft mounted for rotation on said frame means;
(s) first arm means on said third shaft;
(t) telescopically received members pivotally connected between said third arm means and the first arm means of said third shaft;
(u) second arm means on said third shaft; and
(v) spring means connected between the second arm means on said third shaft and said teeth for swinging said teeth upwardly into a subjacent relationship with said frame means when said first shaft has been rotated into a position to raise said frame means.

References Cited in the file of this patent

UNITED STATES PATENTS

| | | |
|---|---|---|
| 2,091,427 | Brodersen | Aug. 31, 1937 |
| 2,228,865 | Bird | Jan. 14, 1941 |
| 2,624,959 | Anderson | Jan. 13, 1953 |
| 3,035,360 | Johnson | May 22, 1962 |

FOREIGN PATENTS

| | | |
|---|---|---|
| 147,050 | Australia | June 26, 1952 |
| 504,750 | Canada | Aug. 3, 1954 |